(12) United States Patent
Leroux et al.

(10) Patent No.: US 8,696,349 B2
(45) Date of Patent: Apr. 15, 2014

(54) STAGED COMBUSTION METHOD USING A LOW-OXYGEN GAS

(75) Inventors: Bertrand Leroux, Issy les Moulineaux (FR); Remi Pierre Tsiava, St Germain les Corbeil (FR); Patrick Jean-Marie Recourt, Marcoussis (FR); Benoit Grand, Versailles (FR); Pascal Duperray, Montigny le Bretonneux (FR); Loic Sylvestre, Meudon la Forêt (FR); Mohand Amirat, Saint-Ouen (FR)

(73) Assignee: L'Air Liquide, Société Anonyme pour l'Étude et l'Exploitation des Procédés Georges Claude, Paris (FR)

( * ) Notice: Subject to any disclaimer, the term of this patent is extended or adjusted under 35 U.S.C. 154(b) by 1784 days.

(21) Appl. No.: 10/582,259

(22) PCT Filed: Dec. 3, 2004

(86) PCT No.: PCT/FR2004/050647
§ 371 (c)(1),
(2), (4) Date: Feb. 21, 2007

(87) PCT Pub. No.: WO2005/059438
PCT Pub. Date: Jun. 30, 2005

(65) Prior Publication Data
US 2007/0281254 A1    Dec. 6, 2007

(30) Foreign Application Priority Data
Dec. 16, 2003 (FR) .................................... 03 51064

(51) Int. Cl.
*F21H 1/00* (2006.01)
(52) U.S. Cl.
USPC .............. 431/10; 431/174; 431/175; 431/190

(58) Field of Classification Search
USPC ........... 431/1, 8, 10, 159, 158, 174, 175, 190, 431/353
See application file for complete search history.

(56) References Cited

U.S. PATENT DOCUMENTS 2,465,525 A * 3/1949 Goddard .......................... 60/247
3,729,285 A * 4/1973 Schwedersky .................... 431/8
(Continued)

FOREIGN PATENT DOCUMENTS

FR    2 823 290    10/2002
FR    2 830 606    4/2003
(Continued)

OTHER PUBLICATIONS

International Search Report for PCT/FR2004/050647.

*Primary Examiner* — Kenneth Rinehart
(74) *Attorney, Agent, or Firm* — Christopher J. Cronin

(57) ABSTRACT

The invention relates to a method for the combustion of a fuel using an oxygenated gas, in which a jet of fuel and at least two jets of oxygen-rich oxygenated gas are injected. According to the invention, the first jet of oxygen-rich oxygenated gas, known as the primary jet, is injected such as to be in contact with the jet of fuel and to produce a first incomplete combustion, the gases produced by said first combustion comprising at least one part of the fuel, and the second jet of oxygen-rich oxygenated gas is injected at a distance I1 from the jet of fuel such as to combust with a first part of the fuel present in the gases produced by the first combustion. Moreover, a low-oxygen oxygenated gas is injected at a distance I2 from the jet of fuel such as to combust with a second part of the fuel present in the gases produced by the first combustion, I2 being greater than I1. The invention also relates to the burner used to carry out the method and to the use of said method for the heating of a glass filler or for a reheating furnace.

12 Claims, 1 Drawing Sheet

(56) References Cited

U.S. PATENT DOCUMENTS

| | | | |
|---|---|---|---|
| 4,761,132 A * | 8/1988 | Khinkis | 431/10 |
| 5,759,022 A * | 6/1998 | Koppang et al. | 431/5 |
| 6,409,499 B1 * | 6/2002 | Feldermann | 431/8 |
| 6,910,879 B2 * | 6/2005 | Dugue et al. | 431/8 |
| 2004/0157178 A1 | 8/2004 | Dugue et al. | |
| 2007/0172781 A1 * | 7/2007 | Tsiava et al. | 431/10 |

FOREIGN PATENT DOCUMENTS

| | | |
|---|---|---|
| WO | WO 02 27236 | 4/2002 |
| WO | WO 2004 094902 | 11/2004 |

* cited by examiner

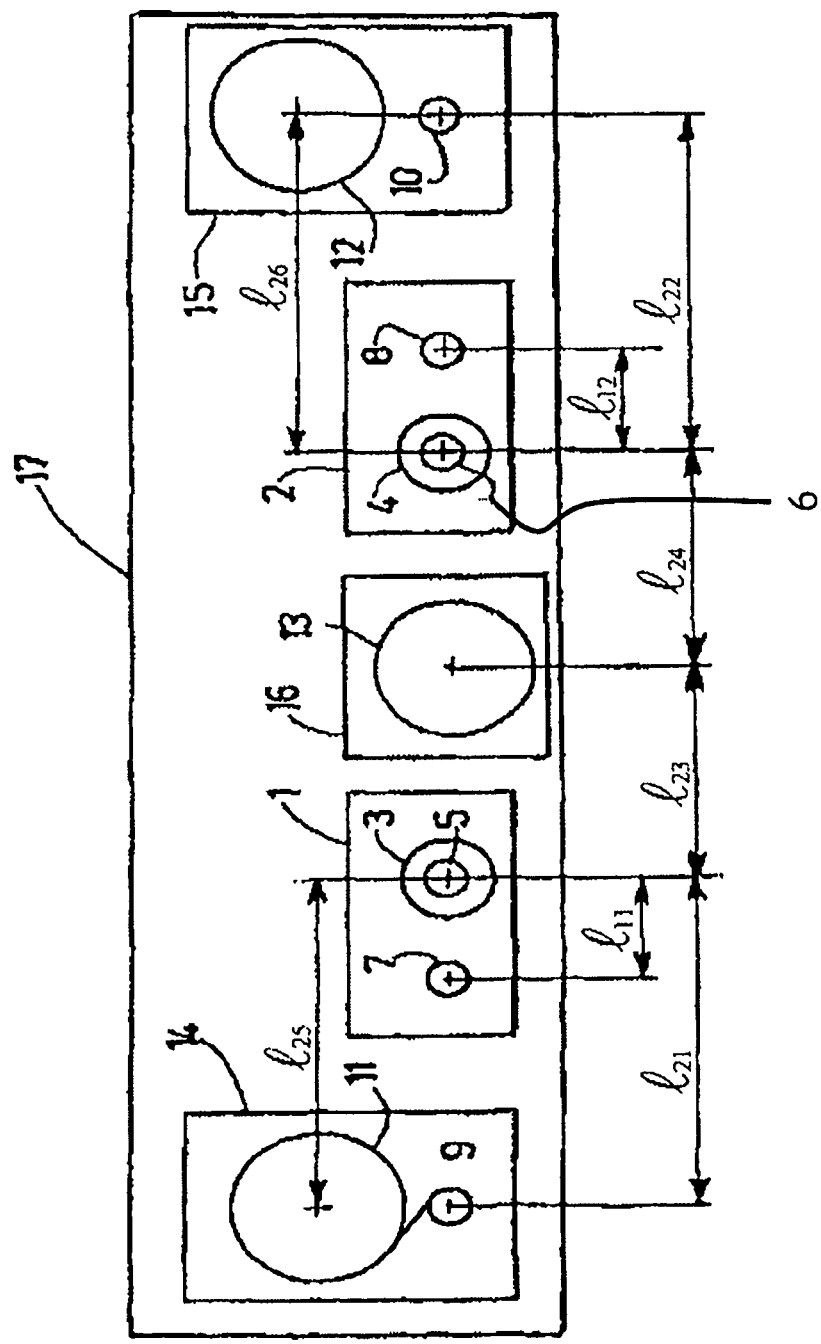

STAGED COMBUSTION METHOD USING A LOW-OXYGEN GAS

The present invention relates to a staged combustion method employing an oxygen-rich oxygenated gas and an oxygen-lean oxygenated gas that can be used during phases in which the supply of oxygen produced by an oxygen production unit are interrupted.

Combustion methods employing oxygenated gases generally use oxygen coming from continuous oxygen production units, such as a cryogenic unit or a VSA (vacuum swing adsorption) unit. To anticipate the risks of interruption in the supply of oxygen coming from these units, a liquid oxygen reservoir is generally provided near the place where the combustion takes place. To reduce the storage costs of this tank and to avoid storing too large an amount of oxygen, which could classify the combustion site as a high accident risk site, it is generally preferred to reduce the capacity of this storage tank. However, this reduction in storage capacity does not always allow the combustion to be fed for a long enough time during an interruption in supply. One solution would be to supply the combustion with air, but generally burners employing a gas richer in oxygen than air do not permit the use of a large flow of air.

The object of the present invention is therefore to propose a combustion method and an associated burner usually operating with a gas richer in oxygen than air, allowing operation with air in the event of an interruption in the continuous supply of oxygen.

For this purpose, the invention relates to a method for the combustion of a fuel using an oxygenated gas, in which a jet of fuel and at least two jets of oxygen-rich oxygenated gas are injected, the first jet of oxygen-rich oxygenated gas, called the primary jet, being injected so as to be in contact with the jet of fuel and so as to generate incomplete first combustion, the gases output by this first combustion still including at least one portion of the fuel, and the second jet of oxygen-rich oxygenated gas being injected at a distance $l_1$ from the jet of fuel so as to combust with a first portion of the fuel present in the gases output by the first combustion, in which process an oxygen-lean oxygenated gas is injected at a distance $l_2$ from the jet of fuel so as to combust with a second portion of the fuel present in the gases output by the first combustion, and $l_2$ is greater than $l_1$.

The invention also relates to a separate-injection burner assembly consisting of at least two blocks and comprising a combustible gas injection orifice and at least four oxygenated-gas injection orifices, in which:
  the first block has a fuel injection orifice and at least two oxygenated-gas injection orifices, the first oxygenated-gas injection orifice being placed so as to be in contact with the fuel injection orifice, the second oxygenated-gas injection orifice being placed at a distance $l_1$ from the fuel injection orifice; and
  the second block has at least third and fourth oxygenated-gas injection orifices, each placed at a distance $l_2$ from the fuel injection orifice of the first block, $l_2$ being greater than $l_1$ and the fourth oxygenated-gas injection orifice having an area of between 4 and 100 times the area of the third orifice.

Finally, the invention relates to the use of the above method when the continuous production of oxygen is interrupted.

Other features and advantages of the invention will become apparent on reading the description that follows. By way of nonlimiting example, the invention is illustrated by FIG. 1, which is a schematic view of a burner assembly according to the invention.

The invention therefore firstly relates to a method for the combustion of a fuel using an oxygenated gas, in which a jet of fuel and at least two jets of oxygen-rich oxygenated gas are injected, the first jet of oxygen-rich oxygenated gas, called the primary jet, being injected so as to be in contact with the jet of fuel so as to generate incomplete first combustion, the gases output by this first combustion still including at least one portion of the fuel, and the second jet of oxygen-rich oxygenated gas being injected at a distance $l_1$ from the jet of fuel so as to combust with a first portion of the fuel present in the gases output by the first combustion, in which method an oxygen-lean oxygenated gas is injected at a distance $l_2$ from the jet of fuel so as to combust with a second portion of the fuel present in the gases output by the first combustion, and in that $l_2$ is greater than $l_1$. The invention therefore consists of a staged combustion method in which the oxygenated gas needed for the combustion of the fuel is divided in the form of at least three jets. One staged combustion method consists in dividing the quantity of oxygenated gas needed for complete combustion of the fuel into at least two complementary oxygenated-gas streams introduced at various distances from the stream of fuel. Thus, a first complementary stream of oxygenated gas is introduced at a very close distance from the stream of fuel. This stream closest to the stream of fuel is called the primary stream; it allows partial combustion of the fuel at a controlled temperature, which limits the formation of NOx. At least another complementary stream of oxygenated gas is introduced at a larger distance from the fuel than the primary stream of oxygenated gas. This makes it possible to complete the combustion of the fuel that has not reacted with the primary oxygenated gas. This stream is called the secondary stream. According to the present invention, the first, primary jet is injected so as to be in contact with the jet of fuel. This means that the distance between the jet of fuel and the primary jet of oxidizer is zero (apart from the possible presence of a duct wall separating these two jets). This primary jet is a jet of oxygen-rich oxygenated gas. According to the invention, an oxygen-rich oxygenated gas has an oxygen concentration of greater than 30% by volume, preferably at least 90% by volume. In general, the oxygen-rich oxygenated gas derives partly from a liquid oxygen storage unit. The liquid oxygen may be diluted with air so that the oxygenated gas injected has an oxygen concentration of greater than 30% by volume, preferably at least 90% by volume. The second and third jets of oxidizer are injected at some distance from the jet of fuel and from the primary jet; they make it possible to supply the quantity of oxidizer needed to complete the combustion of the fuel initiated by the primary jet. According to the invention, the oxygenated gas of the second jet is rich in oxygen and this second jet is injected at a distance $l_1$. Preferably, the distance $l_1$ is between 5 and 20 cm. Again according to the invention, the third jet is lean in oxygen and is injected at a distance $l_2$ greater than $l_1$ and relates to an oxygen-lean oxygenated gas. The term "oxygen-lean" is understood to mean an oxygenated gas having an oxygen concentration of at most 30% by volume. Preferably, this is air. The distance $l_2$ is advantageously greater than 30 cm.

In general, the sum of the quantities of oxygen injected by all the jets of oxygenated gas is approximately stoichiometric, that is to say within an interval of ±15% relative to the stoichiometric quantity needed for complete combustion of the injected fuel. Preferably, the quantity of oxygen injected by the jets of oxygen-rich oxygenated gas represents 10 to 50%, or more preferably 25 to 50%, of the total quantity of oxygen injected.

According to one particular embodiment, the oxygen-lean oxygenated gas may be preheated before being injected.

The invention also relates to a separate-injection burner assembly consisting of at least two blocks and comprising a combustible gas injection orifice and at least four oxygenated-gas injection orifices, in which:

the first block has a fuel injection orifice and at least two oxygenated-gas injection orifices the first oxygenated-gas injection orifice being placed so as to be in contact with the fuel injection orifice, the second oxygenated-gas injection orifice being placed at a distance $l_1$ from the fuel injection orifice; and the second block has at least third and fourth oxygenated-gas injection orifices, each placed at a distance $l_2$ from the fuel injection orifice of the first block, $l_2$ being greater than $l_1$ and the fourth oxygenated-gas injection orifice having an area of between 4 and 100 times the area of the third orifice. The term "block" is understood to mean a refractory block inserted in the wall of the furnace. The term "orifice" is understood to mean a tube for delivering a jet of gas. When implementing a staged combustion method with this burner assembly and an oxygen source of unlimited volume, the first orifice allows the oxygen-rich primary oxygenated gas to be injected, the second and third orifices allowing oxygen-rich oxygenated gases to be injected and no gas is injected into the fourth orifice. This method corresponds to a staged combustion method employing an oxygen-rich oxygenated gas with a primary jet and two secondary jets. During an interruption in the continuous production of oxygen, this burner assembly makes it possible to implement the method according to the invention as described above: the first and second orifices allow the injection of jets of oxygen-rich oxygenated gas, no gas is injected into the third orifice, and an oxygen-lean oxygenated gas is injected into the fourth orifice.

Preferably, the burner assembly is designed so that the distance $l_1$ is between 5 and 20 cm. Furthermore, the distances $l_2$ are advantageously greater than 30 cm. The first oxygenated-gas injection orifice is advantageously placed centrally in the fuel injection orifice.

According to one particular embodiment, the burner assembly may include a third block having a fifth oxygenated-gas injection orifice placed at a distance $l_2$ from the fuel injection orifice and having an area of between 4 and 100 times the area of the third injection orifice. According to this embodiment, the assembly therefore comprises two orifices of large area, each at a distance $l_2$ from the fuel injection. According to this latter embodiment, the assembly may advantageously comprise two first blocks, two second blocks and one third block. In the latter case, the respective distances $l_1$ and $l_2$ to each orifice in first pair of first and second blocks are preferably the same as the respective distances $l_1$ and $l_2$ to each orifice of the same type in the second pair of first and second blocks. The same applies to the areas of the orifices of the first pair of first and second blocks and the areas of the orifices of the same type of the second pair of first and second blocks. Thus, for example, the second and third oxygenated-gas injection orifices of the two second blocks have the same distance $l_1$ and $l_2$ and area values. According to a preferred version of this method, the common fifth orifice has an area greater than that of the fourth orifices.

Finally, the invention relates to the use of the method described above for heating a glass charge or for a reheat furnace.

The invention also relates to the use of the method described above when the continuous production of oxygen is interrupted.

FIG. 1 illustrates the implementation of the method according to the invention using a burner assembly comprising five blocks.

The blocks 1, 2, 14, 15, 16 are integrated into the wall of the furnace 17 and shown from the front. The blocks 1 and 2 each comprise:

a fuel injection orifice 3, 4;

a first orifice 5, 6 for injecting an oxygen-rich oxygenated gas, placed centrally at the center of the respective orifices 3 and 4; and a second orifice 7, 8 for injecting an oxygen-rich oxygenated gas located at a distance $l_{11}$ from the orifice 3 and at a distance $l_{12}$ from the orifice 4, respectively, where $l_{11}=l_{12}$.

The blocks 14 and 15 each comprise:

a third orifice 9, 10 for injecting an oxygen-rich oxygenated gas located at a distance $l_{21}$ from the orifice 3 and at a distance $l_{22}$ from the orifice 4, respectively, where $l_{21}=l_{22}$; and a fourth orifice 11, 12 for injecting an oxygen-lean oxygenated gas, located at a distance $l_{25}$ from the orifice 3 and at a distance $l_{26}$ from the orifice 4, respectively, where $l_{25}=l_{26}$. The area of the fourth orifice 11, 12 is between 4 and 100 times the area of the corresponding third orifice 9, 10.

The block 16 is placed between the blocks 1 and 2 and comprises a fifth orifice 13 for injecting an oxygen-lean oxygenated gas, located at a distance $l_{23}$ from the orifice 3 and at a distance $l_{24}$ from the orifice 4, respectively, where $l_{23}=l_{24}$. The area of the fifth orifice 13 is between 4 and 100 times the area of the third orifice 9 or 10.

During the implementation of a staged combustion method with this burner assembly and an oxygen source, the fuel is injected by the orifices 3 and 4 and the oxygen-rich oxygenated gas is injected by the orifices 5, 6, 7, 8, 9 and 10. No gas is injected by the orifices 11, 12 and 13. This method corresponds to a staged combustion method employing an oxygen-rich oxygenated gas with a primary jet and two secondary jets. During an interruption in oxygen production and the use of oxygen in a limited quantity, this burner assembly allows the method according to the invention described above to be implemented: the fuel is always injected by the orifices 3 and 4 and the oxygen-rich oxygenated gas is always injected by the orifices 5, 6, 7 and 8. In contrast, no oxygenated gas is injected by the orifices 9 and 10 and an oxygen-lean oxygenated gas is injected by the orifices 11, 12 and 13.

By implementing the method as described above it is possible for a burner operating normally with a gas richer in oxygen than air to be supplied with air in the event of an interruption to the continuous supply of oxygen.

Furthermore, in the event of an interruption in the supply of oxygen and the exhaustion of the stored oxygen, it is possible to use the burner according to the invention only with air instead of all oxygenated gases. The combustion process remains effective.

The invention claimed is:

1. A method for the combustion of a fuel using an oxygenated gas, in which a jet of fuel and at least two jets of oxygen-rich oxygenated gas are injected, the first jet of oxygen-rich oxygenated gas, called the primary jet, being injected so as to be in contact with the jet of fuel and so as to generate incomplete first combustion, the gases output by this first combustion still including at least one portion of the fuel, and the second jet of oxygen-rich oxygenated gas being injected at a distance $l_1$ from the jet of fuel so as to combust with a first portion of the fuel present in the gases output by the first combustion, wherein:

an oxygen-lean oxygenated gas is injected at a distance $l_2$ from the jet of fuel so as to combust with a second portion of the fuel present in the gases output by the first combustion the area of the cross section of the injection orifice for the oxygen-lean oxygenated gas is between 4 and 100 times the area of the injection cross section for the second jet of oxygen-rich oxygenated gas; and $l_2$ is greater than $l_1$.

2. The method of claim 1, wherein the oxygen-rich oxygenated gas has an oxygen concentration of greater than 30% by volume.

3. The method of claim 1, wherein the oxygen-lean oxygenated gas has an oxygen concentration of at most 30% by volume.

4. The method of claim 1, wherein the distance $l_1$ is between 5 and 20 cm.

5. The method of claim 4, wherein the distance $l_2$ is greater than 30 cm.

6. The method of claim 1, wherein the quantity of oxygen injected by the jets of oxygen-rich oxygenated gas represents 10 to 50% of the total quantity of oxygen injected.

7. The method of claim 1, wherein the oxygen-lean oxygenated gas is preheated before being injected.

8. The method of claim 1, wherein the oxygen-rich oxygenated gas derives at least partly from a liquid oxygen storage unit.

9. The use of the method of claim 1 for heating a glass charge or for a reheat furnace.

10. The use of the method of claim 1 when the continuous production of oxygen is interrupted.

11. A separate-injection burner assembly consisting of a third block surrounded on each side by a set of blocks comprising, in order, a first block and a second block, in which:
 a) the first block has a fuel injection orifice and at least two oxygenated-gas injection orifices, the first oxygenated-gas injection orifice being placed so as to be in contact with the fuel injection orifice, the second oxygenated-gas injection orifice being placed at a distance $l_1$ from the fuel injection orifice;
 b) the second block has at least third and fourth oxygenated-gas injection orifices, each placed at a distance $l_2$ from the fuel injection orifice of the first block, $l_2$ being greater than $l_1$ and the fourth oxygenated-gas injection orifice having an area of between 4 and 100 times the area of the third orifice; and
 c) the third block has a fifth oxygenated-gas injection orifice placed at a distance $l_2$ from the fuel injection orifice and having an area of between 4 and 100 times the area of the third injection orifice.

12. The burner assembly of claim 11, wherein the first oxygenated-gas injection orifice is placed centrally in the fuel injection orifice.

* * * * *